United States Patent
Nam (10) Patent No.: US 9,538,473 B2
(45) Date of Patent: Jan. 3, 2017

(54) VEHICLE REMOTE CONTROL KEY SYSTEM AND SIGNAL PROCESSING METHOD

(71) Applicant: Hyundai Motor Company, Seoul (KR)

(72) Inventor: Jae Jung Nam, Gyeongsangbuk-Do (KR)

(73) Assignee: Hyudai Motor Company, Seoul (KR)

( * ) Notice: Subject to any disclaimer, the term of this patent is extended or adjusted under 35 U.S.C. 154(b) by 0 days.

(21) Appl. No.: 14/478,492

(22) Filed: Sep. 5, 2014

(65) Prior Publication Data

US 2015/0166075 A1    Jun. 18, 2015

(30) Foreign Application Priority Data

Dec. 17, 2013    (KR) .................. 10-2013-0157657

(51) Int. Cl.
*H04W 52/02*    (2009.01)
*B60R 25/20*    (2013.01)

(52) U.S. Cl.
CPC ...... *H04W 52/0238* (2013.01); *B60R 25/2072* (2013.01)

(58) Field of Classification Search
CPC ............. B60W 50/08; H04W 52/0238; H04W 52/0225; H04W 52/0229; H04W 52/0241; H04W 88/04; H04W 88/005; G07C 9/00182; G07C 9/00309
USPC .......................................................... 701/2
See application file for complete search history.

(56) References Cited

U.S. PATENT DOCUMENTS

| | | | |
|---|---|---|---|
| 2002/0063472 A1* | 5/2002 | Irvin ................... | B60R 25/2009 307/10.1 |
| 2003/0162528 A1* | 8/2003 | Juzswik ............. | G07C 9/00182 455/411 |
| 2012/0191616 A1 | 7/2012 | Putman et al. | |

FOREIGN PATENT DOCUMENTS

| | | |
|---|---|---|
| JP | 2012-026118 | 2/2012 |
| KR | 10-2009-0111464 A | 10/2009 |
| KR | 10-2011-0107191 A | 9/2011 |
| KR | 10-1141807 | 4/2012 |

\* cited by examiner

*Primary Examiner* — Aaron L Troost
(74) *Attorney, Agent, or Firm* — Mintz Levin Cohn Ferris Glovsky and Popeo, P.C.; Peter F. Corless (57) ABSTRACT

A vehicle remote control key system and a method of processing a signal in the system are provided. The system includes a remote control key that is configured to send out a radio frequency (RF) signal that includes an identification (ID) and operation information to remotely control a target vehicle based on a remote control key operation. In addition, a controller is configured to determine whether the ID of the received RF signal is available and perform the remote control when the ID is available and the controller retransmits the RF signal to a vehicle in the vicinity of the target vehicle when the ID is unavailable and increases a count bit, which stores the number or times of retransmission in a frame, by one when retransmitting the RF signal.

16 Claims, 5 Drawing Sheets

FIG. 1

RELATED ART

| Synchronizing code | Leader | Rolling code | ID | Function | CRC |

VEHICLE REMOTE CONTROL KEY SYSTEM AND SIGNAL PROCESSING METHOD

CROSS-REFERENCE TO RELATED APPLICATION

This application claims priority to and the benefit of Korean Patent Application No. 10-2013-0157657 filed in the Korean Intellectual Property Office on Dec. 17, 2013, the entire contents of which are incorporated herein by reference.

BACKGROUND (a) Field of the Invention

The present invention relates to a vehicle remote control key system and a signal processing method thereof.

(b) Description of the Related Art

In general, automotive remove control key systems are used to lock and unlock the vehicle doors with a remote control key or used to support an automotive remote control function such as remote start. In the existing automotive remote control key systems, when a user operates the remote control keys, the keys send out a radio frequency (RF) signal of 433 MHz and vehicles within the range that the RF (radio frequency) signal reaches change from a sleep mode to a wake-up mode with a substantially low current to determine whether the received RF signal is an available signal.

Figure 1:
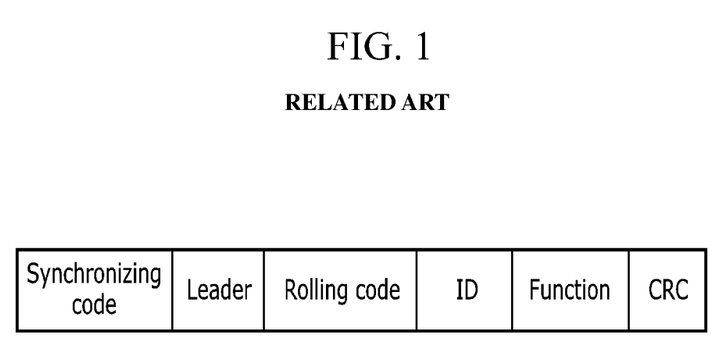
FIG. 1 schematically illustrates an exemplary structure of an RF frame from an existing remote control key according to the related art.

FIG. 1 schematically illustrates an exemplary structure of an RF frame from an existing remote control key. Referring to FIG. 1, when an RF receiver of a vehicle receives an RF signal, the ECU (Electronic Control Unit) that controls the vehicle does not wake up, and the RF module wakes up for a short period of time and determines availability of the identification (ID) by checking the received RF frame. When the ID is not an available signal, the RF receiver goes back into the sleep mode with a low current to reduce a dark current. When ID is an available signal, the RF receiver is configured to detect the operation function (Function) and perform the corresponding instruction.

However, since the existing remote control keys are required to have a lifespan of at least two or more years with substantially small batteries, they are limited in output of RF signals. In other words, since the RF signals from remote control keys usually reach about 30 m on the average, when a vehicle is out of the range, an RF signal fails to reach the vehicle and the vehicle may not be remotely operated. Further, when a vehicle is parked in a wide parking lot or many obstacles are present in the vicinity of the vehicle, the transmission distance of RF signals reduces, and the vehicle may not be remotely controlled.

The above information disclosed in this section is merely for enhancement of understanding of the background of the invention and therefore it may contain information that does not form the prior art that is already known in this country to a person of ordinary skill in the art.

SUMMARY

The present invention provides a vehicle remote control key system that may adjust and increase the sensing distance of a remote control output signal in accordance with a setting by sending other vehicles in the vicinity of the vehicle a signal from a remote control key to retransmit the signal to the target vehicle to increase the reception distance of the remote control key by retransmitting an RF signal, and a signal processing method of the vehicle remote control key system.

An exemplary embodiment of the present invention provides a vehicle remote control key system that may include: a remote control key configured to send out an RF (Radio Frequency) signal including an ID (Identification) and operation information for remotely operating a target vehicle based on a user operation; and a vehicle controller configured to determine whether the ID of the RF signal received from the exterior is available, perform the remote control when the ID is available, and retransmit the RF signal to vehicles in the vicinity of the target vehicle when the ID is unavailable. The vehicle controller is also configured to increase a count bit, which stores the number or times of retransmission in a frame, by one when retransmitting the RF signal.

The received RF signal may be a signal received from the remote control key or a signal retransmitted from another vehicle in the vicinity of the target vehicle. The RF signal from the remote control key may be sequentially retransmitted by at least one vehicle to the target vehicle. The remote control may perform any operation information of opening/closing a door, opening a trunk, opening/closing a window, panic operation, and remote start of a vehicle.

The vehicle controller may include: a receiving module configured to receive the RF signal retransmitted from the remote control key or another vehicle via a receiving antenna; a signal processor configured to determine whether the ID is available by analyzing the frame of the received RF signal, and then retransmit the RF signal and store the ID and the count bit of the RF signal on a retransmission list in response to determining that the ID is unavailable; a transmitter configured to send the RF signal retransmitted by the signal processor to another vehicle in the vicinity of the target vehicle; and a control module configured to change from a sleep mode into a wake-up mode, detect an operation instruction in the RF frame, and execute the corresponding instruction in response to determining that the ID is available.

The signal processor may maintain the control module in a sleep mode in response to determining that the ID is unavailable, and may be configured to change the control module in the sleep mode into a wake-up mode by transmitting the operation information to the control module in response to determining that the ID is available. The signal processor may be configured to disregard an RF signal of which the unavailable ID is the same as the ID stored on the retransmission list and the count bit is the same as or greater than the stored count bit, without retransmitting the RF signal. The signal processor may also be configured to disregard an unavailable RF signal without retransmitting the RF signal, in response to determining that the retransmission count bit of the RF signal reaches a predetermined limit The receiving module may be configured to increase the reception distance of a retransmitted RF signal by setting the radio wave intensity of the RF signal to be greater than that of the remote control key.

Another exemplary embodiment of the present invention provides a method of processing a signal from a vehicle remote control key that may include: acquiring an ID by analyzing the frame of an RF signal received from the exterior and determining the ID is available by comparing the ID with the ID of a vehicle; increasing the count bit recording the number of retransmissions in the frame of the RF signal by one and retransmitting the RF signal to another vehicle in the vicinity of the target vehicle, when the ID is unavailable; and storing the ID and the count bit of the retransmitted RF signal on a retransmission list. In acquiring process, the RF signal may be a signal received directly from the remote control key or a signal retransmitted from a vehicle in the vicinity of the target vehicle.

The method may further include executing a vehicle function according to operation information in the frame, in response to determining that two IDs are the same and the ID is available. The increasing of the bit count may include disregarding the RF signal with an unavailable ID without retransmitting the RF signal, when the count bit of the RF signal is the same as the predetermined limit In addition, the unavailable RF signal may be retransmitted when the ID of the RF signal is on the retransmission list and when the count bit of the RF signal is less than the count bit on the retransmission list. The RF signal may be disregarded without retransmitting the RF signal, when the count bit of the RF signal is the same as or greater than the count bit on the retransmission list. Further, the transmission distance may be increased by setting the radio wave intensity of the RF signal to be retransmitted, to be greater than that of the remote control key, and the RF signal may be transmitted.

According to the exemplary embodiments of the present invention, it may be possible to increase the reception distance and remotely control the target vehicle beyond the reception distance of the remote control key by retransmitting an RF signal from the remote control key through at least one vehicle in the vicinity of the target vehicle. Further, it may be possible to prevent repeated transmission through vehicles and prevent infinite repetition of retransmission by setting the retransmission count bit on an RF signal. Additionally, it may be possible to allow a remote control key to perform various vehicle control functions such as remote control by increasing the reception distance of the remote control key.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, certain exemplary embodiments of the present invention have been illustrated and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

In addition, the terms "-er", "-or" and "module" described in the specification mean units for processing at least one function and operation and can be implemented by hardware components or software components and combinations thereof.

A vehicle remote control key system according to an exemplary embodiment of the present invention and a signal processing method in the vehicle remote control key system are described hereafter in detail with reference to the accompanying drawings.

Figure 2:
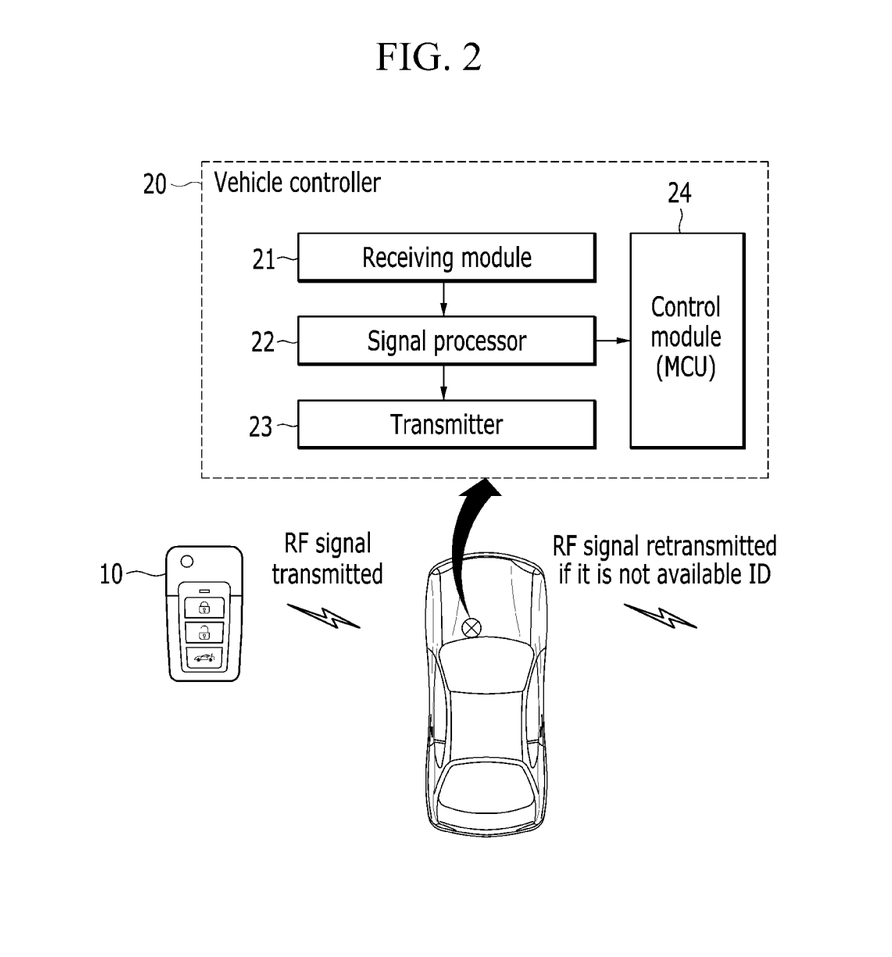
FIG. 2 is an exemplary diagram schematically illustrating the configuration of a vehicle remote key system according to an exemplary embodiment of the present invention.

FIG. 2 is an exemplary diagram schematically illustrating the configuration of a vehicle remote key system according to an exemplary embodiment of the present invention. Referring to FIG. 2, a vehicle remote control key system according to an exemplary embodiment of the present invention may include a remote control key 10 configured to send out an RF (Radio Frequency) signal that includes the ID (Identification) of a target vehicle for remote control in response to an input signal by a user and a vehicle controller 20 configured to perform the remote control when the ID is available and retransmit the received RF signal to vehicles around when the ID is unavailable.

The remote control key 10 may include a remote control function including at least one of opening/closing a door, opening a trunk, opening a window, panic operation, and remote start of a vehicle and may be configured to send out RF signals to vehicles within a predetermined range. The sent-out RF signal may be transmitted to the target vehicle by being retransmitted one time or more by vehicles around the target vehicle, even when the target vehicle is out of the reception distance limit of the remote control key 10. However, retransmission of an RF signal from the remote control key 10 may be infinitely repeated sequentially by the vehicle No. 1, the vehicle No. 2, . . . and the vehicle No. N, so the reception distance may be set by limiting the number of retransmissions.

Figure 3:
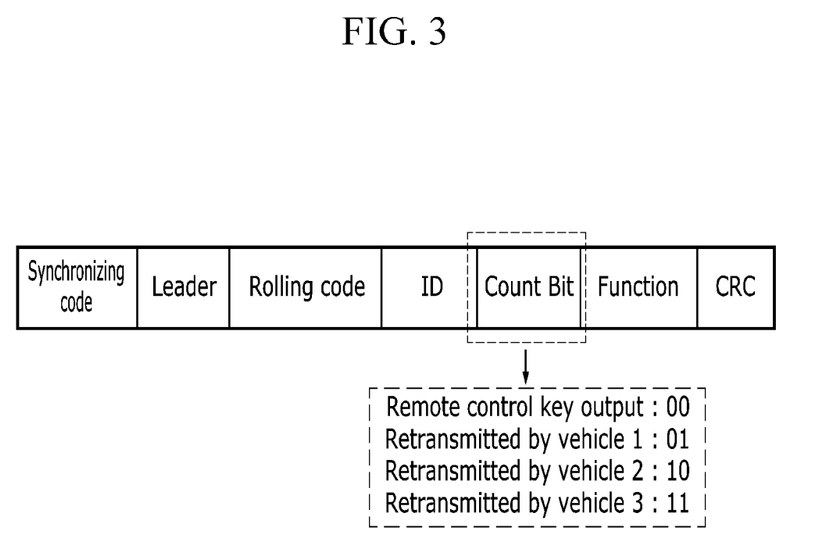
FIG. 3 is an exemplary diagram schematically illustrating the frame structure of an RF signal from a remote control key according to an exemplary embodiment of the present invention.

FIG. 3 is an exemplary diagram schematically illustrating the frame structure of an RF signal from a remote control key according to an exemplary embodiment of the present invention. Referring to FIG. 3, the frame of an RF signal according to an exemplary embodiment of the present invention may include an ID and operation information (Function) for identification and function control of a vehicle and may further include a count bit where the number of times of transmission of an RF signal is recorded. The count bit may serve to prevent infinite retransmission of an RF signal. For example, a binary count bit may be '00' when the remote control key 10 initially sends out an RF signal, and the count bit may be increased by 1 every time other vehicles retransmit the RF signal. Accordingly, an RF signal may be transmitted with the number of times of retransmission limited to three times and the reception distance set as much as the distance according to the number of retransmissions. However, an exemplary embodiment of the present invention is not limited thereto and it may be possible to freely set the distance according to the number of times of retransmission by setting a decimal count bit in the RF frame and the limit of the count bit.

The vehicle controller 20 may include a receiving module 21, a signal processor 22, a transmitter 23, and a control module (micro controller unit) 24. The receiving module 21 may be executed by the controller 20 to transmit an RF signal from the remote control key 10 via a receiving antenna to the signal processor 22, in response to receiving the RF signal. Further, the receiving module 21 may be configured to receive RF signals which have been retransmitted from another vehicle in the vicinity of the target vehicle. The signal processor 22, an RF processor, may be configured to maintain a sleep state (e.g., a sleep mode) to reduce a dark current, and when an RF signal is received, the signal processor 22 may be configured to process the received RF signal and return to the sleep state. The signal processor 22 may be configured to acquire an ID by analyzing the frame of the received RF signal and determine whether the ID is available by comparing the RF signal with the ID of the target vehicle.

When determining that the two IDs are the same and the ID is available, the signal processor 22 may be configured to operate the control module 24, which is in a sleep mode, to change into a wake-up mode by transmitting the corresponding operation information to the control module 24. In addition, when the RF signal is different from the vehicle's ID, the signal processor 22 may be configured to determine that the ID is unavailable, increase the count bit (Count Bit) of retransmission in the corresponding RF frame by 1, and retransmit the signal to the vehicles surrounding the target vehicle. Since the RF signal may be an unavailable signal for the corresponding vehicle (e.g., the target vehicle), the control module 24 consuming a substantial amount of current may be configured to maintain the sleep state without waking up (e.g., turning on).

The signal processor 22 may be configured to store the ID of the retransmitted RF signal and the count bit on a retransmission list, and then, when an RF signal with an ID the same as the that of the stored RF signal, the signal processor 22 may be configured to not retransmit RF signals with a count bit equal to or greater than the transmitted count bit. In other words, the signal processor 22 may be configured to determine that an RF signal with a count bit the same as the count bit stored in the retransmission list is a signal that was retransmitted the same number of times (e.g., at the same point of time), and may be configured to determine that an RF signal with a greater count bit is an RF signal additionally retransmitted after the retransmission and disregard retransmission. Additionally, when receiving another RF signal with a count bit less than the count bit for the retransmission, the signal processor 22 may be configured to determine that the remote control key 10 is operated again, retransmit the RF signal, and store the ID and the count bit again.

Further, the signal processor 22 may be configured to disregard an RF signal with the count bit reaching a retransmission limit (e.g., Max Count) without retransmitting the signal, to prevent infinite transmission of an RF signal. The transmitter 23 may be configured to transmit the RF signal retransmitted by the signal processor 22 to another vehicle in the vicinity of the target vehicle. The transmitter 23 may be configured to use automotive battery power with capacity greater than that of a substantially small battery power of the remote control key 10, and thus, an RF signal may be retransmitted with the radio wave intensity set greater than the remote control key 10. Accordingly, the reception distance for an RF signal of the transmitter 23 may be increased compared to the reception distance for an RF signal of the remote control key 10 retransmitted by the transmitter 23.

The control module 24 may be configured to switch into the wake-up mode when an available RE signal is transmitted from the signal processor 22, and detect the operation information (Function) in the RF frame and perform the corresponding instruction. The control module 24 may be configured to execute at least one function selected from a group consisting of: opening and closing a door, opening a trunk, opening and closing a window, panic operation, and remote start of a vehicle in cooperation with the related controller in the vehicle, in accordance with the operation information (Function).

Figure 4:
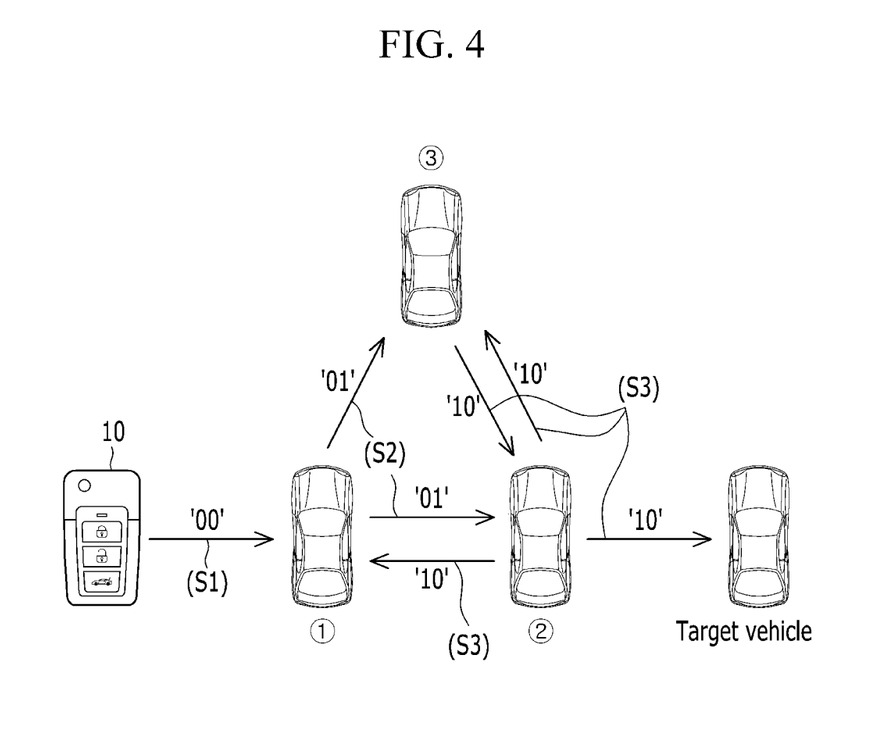
FIG. 4 is an exemplary view illustrating retransmission of an RF signal according to an exemplary embodiment of the present invention.

FIG. 4 is an exemplary view illustrating retransmission of an RF signal according to an exemplary embodiment of the present invention. Referring to FIG. 4, the remote control key 10 may be configured to send out an RF signal that includes any one remote control function of opening/closing a door, opening a trunk, opening/closing a window, panic operation, and remote start of a vehicle to the target vehicle, when a user provides an input via a button (e.g., when the remote control key 10 is operated) (S1).

The first vehicle ① may be configured to receive (e.g., a controller of the first vehicle) an RF signal with a count bit of '00' and determine the ID, and retransmit the RF signal with the count bit changed to '01' when the ID is unavailable (S2). The second and third vehicles ② and ③ may be configured to receive the RF signal with the count bit of '01' and determine the ID, and retransmit the RF signal with the count bit changed to '10' when the ID is unavailable (S3). The second vehicle ② may be configured to receive the RF signal with the count bit of '10' from the third vehicle ③, and the RF signal may have the same ID and count bit of '10' as those of the RF signal already retransmitted, and thus the RF signal may be disregarding without retransmission. The target vehicle may be configured to receive the '10' signal from the second vehicle ② and determine the ID, and then perform the instruction based on the corresponding operation information when the ID is available. Though not illustrated in the figures, when the count bit reaches the predetermined limit (Max Count) of '11' in the middle of retransmission of an RF signal in the same way, the RF signal may not be retransmitted anymore.

Figure 5:
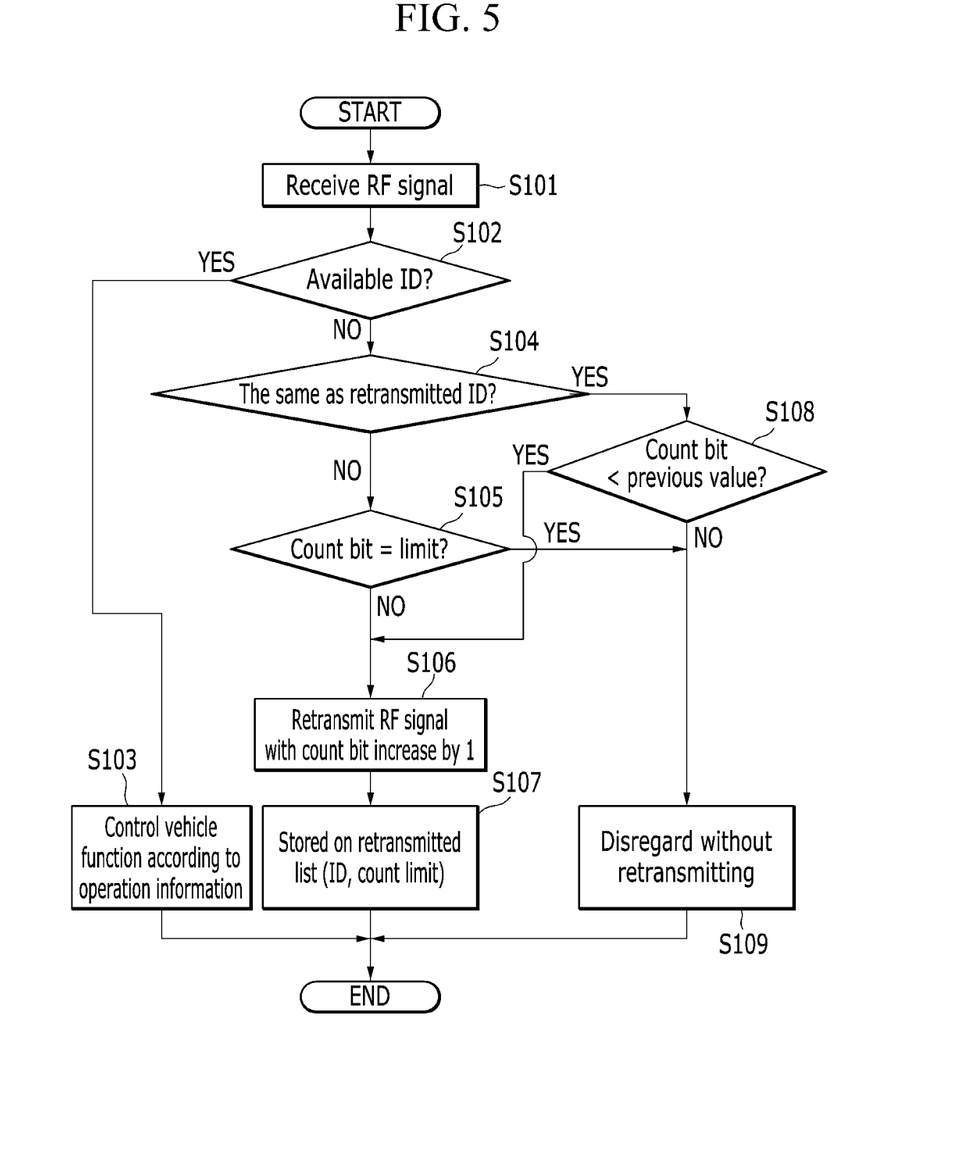
FIG. 5 is an exemplary flowchart schematically illustrating a method of processing a signal from a vehicle remote key according to an exemplary embodiment of the present invention.

A method of processing a signal from a vehicle remote control key, based on the configuration of the vehicle remote control key system according to an exemplary embodiment of the present invention is described with reference to FIG. 5. FIG. 5 is an exemplary flowchart schematically illustrating a method of processing a signal from a vehicle remote key according to an exemplary embodiment of the present invention.

Referring to FIG. 5, when the vehicle controller 20 according to an exemplary embodiment of the present invention receives an RF signal from the exterior (S101), the ID may be acquired by analyzing the frame of the received RF signal and the vehicle controller 20 may be configured to determine whether the ID is available by comparing the ID with the ID of the target vehicle (S102). The received RF signal may be a signal directly from the remote control key 10 or a signal retransmitted from a vehicle around the target vehicle.

The vehicle controller 20 may be configured to execute the vehicle function based on the corresponding information (S103), in response to determining that the two IDs are the same and the ID is available (Yes in S102). In addition, when the ID of the RF signal is different from the ID of the target vehicle, the vehicle controller 20 may be configured to determine that the ID is unavailable (No in S102), and determine whether the ID is the same as the ID of the RF signal previously retransmitted (S104).

When the ID is not the same as the ID of the RF signal previously retransmitted (No in S104), the vehicle controller 20 may be configured to increase the count bit of the RF signal by 1 and retransmit the RF signal to vehicles in the vicinity of the target vehicle (S106) when the count bit of the RF signal is not the predetermined limit (No in S105). Further, the vehicle controller 20 may be configured to store the ID and the count bit of the RF signal on the retransmission list (S107). When the ID of the RF signal is the same as the ID of the retransmitted RF signal (Yes in S104), and when the count bit of the RF signal is less than the count bit of the retransmitted RF signal (Yes in S108), the vehicle controller 20 may be configured to perform step S106 of retransmitting the RF signal.

Furthermore, when the count bit of the RF signal is the same as or greater than the count bit of the count bit of the retransmitted RF signal in step S108, the vehicle controller 20 may be configured to disregard the RF signal without repeating retransmission (S109). Additionally, when the count bit of the RF signal is the same as the predetermined limit in step S105 (No in S105), the vehicle controller 20 may be configured to disregard the RF signal without retransmitting the RF signal to prevent infinite retransmission (S109).

Therefore, according to an exemplary embodiment of the present invention, it may be possible to increase the reception distance and remotely control the target vehicle beyond the reception distance of the remote control key by retransmitting an RF signal from the remote control key through at least one vehicle in the vicinity of the target vehicle. Further, it may be possible to prevent repeated transmission through vehicles and prevent infinite repetition of retransmission by setting the retransmission count bit on an RF signal. It may also be possible to allow a remote control key to perform various vehicle control functions such as remote control by increasing the reception distance of the remote control key.

Exemplary embodiments of the present invention are not implemented only by the apparatus and/or method described above and may be implemented by programs that implement the function of the configurations in the exemplary embodiments of the present invention or recording medium having the programs, and the present invention may be easily implemented by those skilled in the art from the exemplary embodiments described above.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

DESCRIPTION OF SYMBOLS

10: Remote control key
20: Vehicle controller
21: Receiving module
22: Signal processor
23: Transmitter
24: Control module

What is claimed is:

1. A vehicle remote control key system, comprising:
a radio frequency (RF) receiver receiving an RF signal which is sent out from a remote control key or retransmitted from another vehicle, the RF signal includes an identification (ID) and operation information to remotely control a target vehicle based on a remote control key operation;
a transmitter retransmitting the RF signal; and
a controller having a memory and a processor and configured to:
determine whether the ID of the RF signal received by the RF receiver is available;
perform the remote control when the ID is available;
control the transmitter to retransmit the RF signal to a vehicle in the vicinity when the ID is unavailable under a first condition;
increase a count bit, which represents the number or times of retransmissions and is stored in a frame of the RF signal, by one when retransmitting the RF signal; and
store the ID and the increased count bit of the RF signal on a retransmission list of the memory when retransmitting the RF signal;

wherein the controller analyzes the frame of the RF signal to determine whether the ID of the RF signal received by the RF receiver is available, wherein the controller switches from a sleep mode into a wake-up mode, detects an operation instruction in the RF signal, and executes the corresponding instruction in response to determining that the ID is available, wherein the controller determines whether the ID of the RF signal is on the retransmission list in response to determining that the ID is unavailable, wherein the controller compares the count bit of the RF signal with the increased count bit stored on the retransmission list when the ID of the RF signal is on the retransmission list, wherein the controller disregards the RF signal when the ID is unavailable and the same as the ID stored on the retransmission list, and the count bit of the RF signal is equal to or greater than the increased count bit stored on the retransmission list, without retransmitting the RF signal, and wherein the first condition is that the ID of the RF signal is not on the retransmission list or the count bit of the RF signal is less than the increased count bit stored on the retransmission list.

2. The system of claim 1, wherein the received RF signal is a signal received from the remote control key or a signal retransmitted from another vehicle in the vicinity of the target vehicle.

3. The system of claim 2, wherein the RF signal from the remote control key is sequentially retransmitted by at least one vehicle to the target vehicle.

4. The system of claim 1, wherein the remote control is configured to perform an operation information selected from a group consisting of: opening and closing a door, opening a trunk, opening and closing a window, panic operation, and remote start of the vehicle.

5. The system of claim 1, wherein the controller is configured to maintain the sleep mode in response to determining that the ID is unavailable, and switch to the wake-up mode by transmitting the operation information in response to determining that the ID is available.

6. The system of claim 1, wherein the controller is configured to disregard the unavailable RF signal without retransmitting the RF signal, in response to determining that the increased count bit of the RF signal reaches a predetermined limit.

7. The system of claim 1, wherein the controller is configured to increase the reception distance of a retransmitted RF signal by setting the radio wave intensity of the RF signal greater than that of the remote control key.

8. A method of processing a signal from a vehicle remote control key, comprising:
acquiring, by a controller, an identification (ID) by analyzing the frame of a received radio frequency (RF) signal and determining the ID is available by comparing the ID with the ID of a target vehicle;
increasing, by the controller, a count bit that records the number of times of retransmission in the frame of the RF signal by one and retransmitting the RF signal to another vehicle in the vicinity under a first condition, when the ID is unavailable; and
storing, by the controller, the ID and the count bit of the retransmitted RF signal on a retransmission list,
wherein the increasing of the count bit includes:
determining, by the controller, whether the ID of the RF signal is on the retransmission list in response to determining that the ID is unavailable;
comparing, by the controller, the count bit of the RF signal with the increased count bit stored on the retransmission list when the ID of the RF signal is on the retransmission list;
retransmitting, by the controller, the RF signal of which the ID is unavailable under the first condition that the ID of the RF signal is not on the retransmission list or the count bit of the RF signal is less that the count bit on the retransmission list; and
disregarding, by the controller, the RF signal without retransmitting the RF signal, when the ID of the RF signal is on the retransmission list and when the count bit of the RF signal is equal to or greater than the count bit on the retransmission list.

9. The method of claim 8, wherein, in acquiring the ID, the RF signal is a signal received directly from the remote control key or a signal retransmitted from a vehicle in the vicinity.

10. The method of claim 8, further comprising:
executing, by the controller, a vehicle function based on operation information in the frame, in response to determining that two IDs are the same and the ID is available.

11. The method of claim 8, wherein increasing of the count bit includes:
disregarding, by the controller, the RF signal with an unavailable ID without retransmitting the RF signal, when the count bit of the RF signal is the same as a predetermined limit.

12. The method of claim 8, wherein increasing the count bit includes:
setting, by the controller, a radio wave intensity of the RF signal to be retransmitted, greater than that of the remote control key; and
transmitting, by the controller, the RF signal.

13. A non-transitory computer readable medium containing program instructions executed by a controller, the computer readable medium comprising:
program instructions that acquire an identification (ID) by analyzing the frame of a received radio frequency (RF) signal and determining whether the ID is available by comparing the ID with the ID of a target vehicle;
program instructions that increase a count bit that records the number of times of retransmission in the frame of the RF signal by one and retransmitting the RF signal to another vehicle in the vicinity under a first condition, when the ID is unavailable; and
program instructions that store the ID and the count bit of the retransmitted RF signal on a retransmission list,
wherein the increasing of the count bit includes:
determining whether the ID of the RF signal, which is unavailable, is on the retransmission list;
comparing the count bit of the RF signal with the count bit on the retransmission list when the ID of the RF signal is on the retransmission list;
retransmitting the RF signal of which the ID is unavailable under the first condition that the ID of the Rf signal is not on the retransmission list or the count bit of the RF signal is less than the count bit on the retransmission list; and
disregarding the RF signal without retransmitting the RF signal, when the ID of the RF signal is on the retransmission list and when the count bit of the RF signal is equal to or greater than the count bit of the retransmission list.

14. The non-transitory computer readable medium of claim 13, wherein, in acquiring the ID, the RF signal is a signal received directly from the remote control key or a signal retransmitted from a vehicle in the vicinity of the target vehicle.

15. The non-transitory computer readable medium of claim 13, further comprising:
   program instructions that execute a vehicle function based on operation information in the frame, in response to determining that two IDs are the same and the ID is available.

16. The non-transitory computer readable medium of claim 13, further comprising:
   program instructions that disregard the RF signal with an unavailable ID without retransmitting the RF signal, when the count bit of the RF signal is the same as a predetermined limit.

* * * * *

UNITED STATES PATENT AND TRADEMARK OFFICE
CERTIFICATE OF CORRECTION

PATENT NO. : 9,538,473 B2  
APPLICATION NO. : 14/478492  
DATED : January 3, 2017  
INVENTOR(S) : Jae Jung Nam Page 1 of 1

It is certified that error appears in the above-identified patent and that said Letters Patent is hereby corrected as shown below:

On the Title Page

Item (73) Assignee:, please replace:
"Hyudia Motor Company, Seoul (KR)"
With:
"Hyundai Motor Company, Seoul (KR)"

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*